3,428,725
**PROCESS OF CASTING A POLYURETHANE
TO FORM A FLEXIBLE MOLD**
John Delmonte, Glendale, and Paul L. Meadows, Burbank, Calif., assignors to Furane Plastics Incorporated, a corporation of California
No Drawing. Filed Dec. 11, 1964, Ser. No. 417,766
U.S. Cl. 264—226         8 Claims
Int. Cl. B29c 1/02, 1/04

ABSTRACT OF THE DISCLOSURE

A process for making a flexible polyurethane cavity mold cured at room temperature, which is strippable from the original model, and subsequently strippable from hardened castings formed therein; and the product of said process.

---

This invention relates to a method for making flexible molds which have high tensile strength while also having high elongation and pliability, so that the mold may be stripped from the cast replica after setting without injury to the mold or to the replica. Another object is to provide bubble free, flexible molds of various sizes, against both hydrophobic and hydrophilic surfaces, which is a serious problem when employing castable urethane polymers. It is a further object to provide a method for preparing flexible molds which permit curing of urethane resins at room temperature under conditions which are normally detrimental to the cure of urethane resins. A further object is to provide a method for making flexible molds which involves the use of highly fluid isocyanate prepolymers and highly fluid curing agents.

We have discovered that polyurethane elastomer casting compositions may be employed in preparing flexible molds, wich in turn may be used in the casting of ceramic and plaster objects, and quite unexpectedly, these cured urethane molds, with proper surface preparation, may be used to cast and cure replicas of the same or other urethane polymers, and also of phenolic aldehyde resins, epoxy resins based on diglycidyl ethers of bisphenol A, and the like. These proper surface preparations involve suitable steps to minimize moisture and solvent vapors during the preparation of the molds, although the molds when properly cured have high resistance to moisture and chemicals. We have further discovered that by the use of high fluidity isocyanate prepolymer liquid with high fluidity curing agents, all bubbles may be removed by application of a reduced pressure, thereby giving cured molds which are free from the imperfections resulting from bubbles. We have further discovered that in the use of certain compositions, it is advantageous to effect a partial cure of the urethanes in the mold, following which the models or patterns are removed from the partly cured molds, and then the cure completed out of contact with the models or patterns. This procedure is especially effective to prevent sticking of the parts.

In the preparation of the flexible molds (for subsequent use in casting ceramics, plaster of paris, synthetic resins or other types of pour castings) a split or sectional plaster case is first prepared by using as a pattern a modified model which has been covered with an oil base or water base "molding clay" or the like, applied by hand over the model to define the proper thickness of the walls for the flexible mold, a thickness determined by the rigidity, flexibility and tear strength required in the particular model shape and detail. A plaster slurry is then poured around the clay-modified model and built up with the use of hemp fibers wetted with plaster slurry. This forms an outer case whose inner surface will determine the outer surfaces of the flexible mold. Soap or stearate parting agents are used for release. After the plaster has set, the outer case, which may be in multiple sections, is opened, and then dried to remove excess water beyond that required for the hydration of the calcium sulfate hemi-dydrate. The true model (stripped of molding clay) is then positioned inside the dried plaster case by conventional keys or locating devices to maintain the desired clearance between model and case.

For simple flat models the mold making procedure is simplified to the extent that a rectangular or circular enclosure of rigid material surrounds the model. The function of the enclosure is to confine the pourable urethane mold material which, according to the practices of our invention, may be removed before it is fully cured. For these simple models, the preparation of an outer case, as described above, is not necessary.

A liquid resin casting composition such as a polyurethane elastomer is poured in after having first been subjected to a vacuum degassing operation for several minutes to remove any bubbles in the liquid mixture. If the presence of bubbles in the mold offers no problem, or if the urethane is fluid enough so that bubbles will rise to the top surface when the hardener and urethane resin are mixed, the vacuuming may be omitted. The liquid is poured in carefully to avoid the entrapment of pockets of air or the formation of bubbles, by pouring a steady stream so that liquid rises from the bottom of the mold-defining cavity to the top. The case, model, and poured flexible mold shaped by the case and model are then allowed to stand at room temperature until the flexible mold has been at least partly cured.

Prior to carrying out the described casting operation, it is necessary to prepare the model and the plaster case so that no moisture or solvent fumes will come in contact with the polyurethane elastomer liquid while it is being cured. This involves coating the previously dried plaster with a sealant of lacquer, polyvinyl chloride, cellulosic composition, shellac, or other film-forming material which is substantially free of hydrophilic groups, and which does not react with or inhibit the cure of liquid polyurethanes. The surface of the model (if it may contain moisture, for example, as in a plaster model), is also coated with the same type of sealant. It is also important to dry thoroughly all films to remove traces of the solvents in which they had been dispersed. The models and the cases which define the molds must next be coated with release agents which do not attack the sealing film and which provides a release means for the polyurethane mold which is to be shaped by these surfaces. Silicone resins and fluorocarbon resins in thin films are particularly effective as release agents. A urethane casting with such a release film is particularly desirable as a model against which the mold is made.

Where split plaster cases are employed and multiple parting surfaces are present, it has been found that good sealing putties may be made using urethane polymers. Glass fibers and finely divided siliceous fillers, and carbon black will provide thixotropic mixtures with liquid urethane resins, and may be used if necessary to seal leaky cases or containers in which urethane elastomers are to be cast. The urethane putties are more desirable and are to be preferred to plaster-hemp or clay sealants ordinarily used for such purposes.

As further examples of sealing films, the plaster surfaces may also be brush- or spray-coated with coating resins based on urethane systems or epoxy systems, which films upon curing are treated with release agents as above described. The model itself may be coated with solvent-dissolved hydrophobic film-producing liquids such as shellac or polyvinyl chloride resins.

A urethane sealing paste may be prepared from the same composition as the room temperature curing composition used for the mold with the addition of thixotropic agents and glass fibers, and this is applied at mold parting lines before the main mold material is mixed and poured. Other commercial pastes of a similar nature may be used, providing they are of a hydrophobic nature when cured.

While the cured polyurethane resin of which the flexible mold is composed is extremely resistant to water after curing, it is quite sensitive to moisture before curing, and the presence of moisture may produce bubbles and retard or spoil the cure of the material.

A suitable polyurethane-forming liquid for use in preparing the flexible molds as above described should be of a composition to cure to a Shore A hardness at 75° F. in the range from 20 to 75, a preferred range being from 30 to 60 for the usual requirements for service as a flexible mold.

One example of a suitable liquid resin composition for making the polyurethane flexible molds consists of prepolymers prepared from (1) polyethers, for example polyethylene or polypropylene glycols having a molecular weight of 500–5000, or polytetra methylene ether glycols of molecular weight of 300 to 4000, reacted with (2) a molar excess of tolylene di-isocyanate to form a prepolymer with a free NCO content in the range of 2.0 to 10.0%. The preferred range of free NCO content is 3.0 to 6.0%. We may also use liquid urethane compositions based on hydroxyl terminated polyesters, and reacted with di-isocyanates, but the polyether systems are preferred.

The selected liquid resin composition is mixed with a liquid curing agent for polyurethanes. The liquid curing agent may consist of liquid polyols plus a catalyst such as triethylenediamine, lead napthenate, or organic tin compounds, or it may consist of heated mixtures or modifications of methylene bis orthochloro aniline solubilized in reactive polyols, or in nonreactive phosphate plasticizers such as tricresyl phosphate. A preferred liquid room-temperature curing agent consists of equal proportions of an aryl amine, such as 4,4'-methylene bis(2-chloroaniline)-dissolved by melting at 100° C. with N-methyl-2-pyrrolidone.

The liquid resin and the curing agent are mixed immediately prior to pouring into the cavity between the prepared case internal surface and the model. The working life of the mixture may be varied from 10 minutes to several hours, although 20 to 60 minutes appears to satisfy most requirements. The quality of the molds may be improved by the inclusion of antifoam agents based on silicones or polybutenes, which because of their storage immiscibility with polyurethane prepolymers, may be introduced into the liquid urethane prepolymer or hardener just prior to mixing and pouring the molds.

The desirable physical properties of the flexible mold materials are: tensile strength in the range from 600 to 3000 p.s.i.; elongation 150 to 450 percent; tear strength, 50 to 150 lb. per in.; water gain, not over 0.5 percent in 24 hours; tensile strength change after one month in water, less than 30 percent; tensile elongation change after one month in water, plus or minus 20 percent.

The problem of the sticking of the cast polyurethane composition to the model may be overcome by removing the molds after the composition has jelled to a Shore hardness of 10 to 50, and subsequently completing the cure in the open air for 24 to 48 hours; or curing at 150° F. for a period of 3 to 6 hours.

After the mold has been prepared, a duplicate urethane model may be cast of the same material as the mold, after applying a release agent on the urethane mold. A permanent record model can thus be prepared of the same substance as the mold material.

The advantages of our process will be apparent from the above description. The objectives set forth in the beginning have been attained.

We claim:

1. The process of forming a flexible mold for use in casting replicas of a model, comprising the steps of pouring a highly fluid polyurethane-forming liquid into a cavity mold, said cavity mold having a solid model or pattern disposed therein whereby to produce the desired cavity in said flexible mold, allowing said polyurethane-forming liquid to cure at room temperature to a flexible solid state in said cavity mold-and-pattern assembly, removing said flexible mold and the enclosed model from said cavity mold, and then stripping said flexible mold from said model.

2. The process defined in claim 1 in which the flexible mold is partly cured in the cavity mold to a Shore hardness in the range of 10 to 50, followed by removal of the flexible mold and subsequent complete curing in air outside said cavity mold whereby to prevent sticking of the polyurethane to the model or pattern.

3. The process defined in claim 1 in which said cavity mold is composed of hardened gypsum plaster, the surface of said cavity being sealed with a hydrophobic film.

4. The process defined in claim 1 in which the surface of the model or pattern is sealed with a hydrophobic film.

5. The process defined in claim 1 in which the inner surface of the cavity mold and the surface of the model or pattern are sealed with a hydrophobic sealing film, and are subsequently coated with a release agent which is inert to said sealing film.

6. The process defined in claim 1 in which the highly fluid polyurethane-forming material consists of a prepolymer mixture of polyethylene glycol having a molecular weight in the range of 500 to 5000 and tolylene di-isocyanate, said mixture having a free —NCO— content in the range of 2.0 to 10.0 percent, and a highly fluid curing agent for said prepolymer.

7. The process of forming a flexible mold, comprising the steps of removing excess moisture from the model and its outer encasement; sealing the casting surfaces with a hydrophobic film which is nonreactive with the urethane prepolymer which is to be cast, removing solvents from said films; applying release agents which do not attack the said sealing film; mixing a liquid urethane prepolymer and its liquid curing agent; applying a vacuum to the mixed urethane prepolymer and its curing agent; pouring said degassed prepolymer and curing agent over and around the model; and allowing the casting to gel; and prior to the attainment of complete cure, stripping the flexible urethane mold from the model whereby to prevent sticking of the casting to the model.

8. The process of forming a flexible mold, comprising the steps of removing excess moisture from the model and its outer encasement; sealing the casting surfaces with a hydrophobic film which is nonreactive with the urethane prepolymer which is to be cast, removing solvents from said films; applying release agents which do not attack the said sealing film; mixing a liquid urethane prepolymer and its curing agent; adding an antifoaming agent selected from the group consisting of silicones and polybutenes in adequate amount to prevent foaming; pouring said prepolymer and curing agent over and around the model; and allowing the casting to gel; and prior to the attainment of full hardness, stripping the urethane mold from the model.

(References on following page)

References Cited

UNITED STATES PATENTS

| | | | |
|---|---|---|---|
| 2,729,618 | 1/1956 | Muller et al. | |
| 3,002,866 | 10/1961 | Gartrell et al. | 264—338 |
| 3,105,062 | 9/1963 | Graham et al. | 264—137 |
| 3,168,605 | 2/1965 | Ellegant et al. | 264—313 |
| 3,222,443 | 12/1965 | Dames et al. | 264—337 |
| 3,267,191 | 8/1966 | Williams et al. | 264—313 |
| 3,201,136 | 8/1965 | Harrison et al. | 260—77.5 |

OTHER REFERENCES

Dow Corning Bulletin: "Silastic RTV," 1962 Form # 08–010 8 pg. copy in 264–225. pg. 3 & 4.

Saunders et al.: "Polyurethane" vol. II, 1964 TP 986 P 653 pp. 392, 393, 779, 782, 783, 432, 433, 434, 435.

JULIUS FROME, *Primary Examiner.*

A. H. KOECKERT, *Assistant Examiner.*

U.S. Cl. X.R.

18—47; 260—37, 77.5; 264—79, 227, 236, 300, 337, 338, 336, 347